(12) United States Patent
Alshina et al.

(10) Patent No.: US 10,027,967 B2
(45) Date of Patent: *Jul. 17, 2018

(54) METHOD AND APPARATUS FOR ENCODING VIDEO SIGNAL AND METHOD AND APPARATUS FOR DECODING VIDEO SIGNAL

(71) Applicant: SAMSUNG ELECTRONICS CO., LTD., Suwon-si (KR)

(72) Inventors: Elena Alshina, Suwon-si (KR); Yoon-mi Hong, Seoul (KR); Woo-jin Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,173

(22) Filed: Nov. 15, 2016

(65) Prior Publication Data

US 2017/0064314 A1   Mar. 2, 2017

Related U.S. Application Data

(63) Continuation of application No. 13/108,188, filed on May 16, 2011, now Pat. No. 9,525,889.

(Continued)

(30) Foreign Application Priority Data

Jan. 21, 2011   (KR) ........................ 10-2011-0006485

(51) Int. Cl.
*H04N 19/36* (2014.01)
*H04N 19/124* (2014.01)

(Continued)

(52) U.S. Cl.
CPC ............ *H04N 19/36* (2014.11); *H04N 19/124* (2014.11); *H04N 19/13* (2014.11); *H04N 19/159* (2014.11);

(Continued)

(58) Field of Classification Search
None
See application file for complete search history.

(56) References Cited

U.S. PATENT DOCUMENTS

| | | |
|---|---|---|
| 5,389,973 A | 2/1995 | Kitamura et al. |
| 5,793,658 A | 8/1998 | Adiletta |

(Continued)

FOREIGN PATENT DOCUMENTS

| | | |
|---|---|---|
| CN | 1592419 A | 3/2005 |
| CN | 1843040 A | 10/2006 |

(Continued)

OTHER PUBLICATIONS

Communication dated Jan. 16, 2012 issued by the International Searching Authority in International Patent Application No. PCT/KR2011/003607.

(Continued)

*Primary Examiner* — Frederick D Bailey
(74) *Attorney, Agent, or Firm* — Sughrue Mion, PLLC

(57) ABSTRACT

Provided are a method and apparatus for encoding a video signal and a method and apparatus for decoding a video signal. The method of encoding the video signal includes: determining an optimum scaling bit depth of the video signal in consideration of a maximum bit number of an intermediate value obtained during transformation of the video signal and a maximum bit precision of the video signal; scaling the video signal according to a local shift value corresponding to a difference between the determined opti- (Continued)

mum scaling bit depth and an original bit depth of the video signal; and transforming the scaled video signal.

2 Claims, 9 Drawing Sheets

Related U.S. Application Data

(60) Provisional application No. 61/334,632, filed on May 14, 2010.

(51) Int. Cl.
| | | |
|---|---|---|
| *H04N 19/63* | (2014.01) | |
| *H04N 19/159* | (2014.01) | |
| *H04N 19/625* | (2014.01) | |
| *H04N 19/61* | (2014.01) | |
| *H04N 19/13* | (2014.01) | |
| *H04N 19/42* | (2014.01) | |
| *H04N 19/40* | (2014.01) | |
| *H04N 19/174* | (2014.01) | |
| *H04N 19/184* | (2014.01) | |

(52) U.S. Cl.
CPC .......... *H04N 19/40* (2014.11); *H04N 19/42* (2014.11); *H04N 19/61* (2014.11); *H04N 19/625* (2014.11); *H04N 19/63* (2014.11); *H04N 19/174* (2014.11); *H04N 19/184* (2014.11)

(56) References Cited

U.S. PATENT DOCUMENTS

| | | | |
|---|---|---|---|
| 6,377,706 B1 | 4/2002 | de Queiroz | |
| 6,731,686 B1 * | 5/2004 | Sudharsanan | H03M 7/425 375/240.25 |
| 7,277,486 B2 | 10/2007 | Srinivasan et al. | |
| 7,599,438 B2 | 10/2009 | Holcomb et al. | |
| 7,599,840 B2 | 10/2009 | Mehrotra et al. | |
| 7,693,709 B2 | 4/2010 | Thumpudi et al. | |
| 7,983,496 B2 | 7/2011 | Liu et al. | |
| 8,064,517 B1 | 11/2011 | Viscito et al. | |
| 2003/0118240 A1 | 6/2003 | Satoh et al. | |
| 2003/0202589 A1 | 10/2003 | Reitmeier et al. | |
| 2005/0047509 A1 | 3/2005 | Lee et al. | |
| 2005/0117653 A1 | 6/2005 | Sankaran | |
| 2005/0141609 A1 | 6/2005 | Malvar | |
| 2005/0244071 A1 | 11/2005 | Zaharia et al. | |
| 2006/0038826 A1 | 2/2006 | Daly | |
| 2006/0177142 A1 | 8/2006 | Chou | |
| 2006/0227867 A1 | 10/2006 | Winger et al. | |
| 2007/0053620 A1 | 3/2007 | Mizuno | |
| 2007/0237409 A1 | 10/2007 | Atsumi et al. | |
| 2008/0240257 A1 * | 10/2008 | Chang | H04N 19/61 375/241 |
| 2009/0003457 A1 | 1/2009 | Liu et al. | |
| 2009/0080513 A1 | 3/2009 | Chujoh et al. | |
| 2009/0097763 A1 | 4/2009 | Chiu | |
| 2009/0168869 A1 | 7/2009 | Melamed et al. | |
| 2012/0177109 A1 * | 7/2012 | Ye | H04N 19/197 375/240.03 |
| 2018/0103269 A1 | 4/2018 | Pandit et al. | |

FOREIGN PATENT DOCUMENTS

| | | | |
|---|---|---|---|
| CN | 101223573 A | | 7/2008 |
| CN | 101313584 A | | 11/2008 |
| CN | 101448075 A | | 6/2009 |
| CN | 101682786 A | | 3/2010 |
| EP | 0182940 A1 | | 6/1986 |
| EP | 1 929 785 B1 | | 7/2011 |
| JP | 2005354307 | * | 12/2005 |
| WO | 2007081869 A2 | | 7/2007 |
| WO | 2011/142645 A2 | | 11/2011 |

OTHER PUBLICATIONS

Communication dated May 15, 2014 issued by the Intellectual Property Corporation of Malaysia in counterpart Malaysian Patent Application No. PI2012004942.
Communication dated Jun. 25, 2015 issued by the State Intellectual Property Office of P.R China in counterpart 201180034696.4.
Chono et al., "Description of video coding technology proposal by NEC Corporation", JCT-VC 1st Meeting, Apr. 15-23, 2010, 57 pages total, JCTVC-A104, Dresden, DE.
Lee et al., "Energy-Optimized Image Communication on Resource-Constrained Sensor Platforms", Apr. 25-27, 2007, 10 pages total, Cambridge, Massachusetts.
Communication dated Jul. 20, 2015 issued by European Patent Office in counterpart European Application No. 11780862.6.
Reznik et al., "Efficient Fixed-Point Approximations of the 8x33 8 Inverse Discrete Cosine Transform", 2007, 17 pages total, SPIE vol. 669617-1.
Chujoh et al., "Internal bit depth increase except frame memory", ITU—Telecommunications Standarization Sector 32nd Meeting, Apr. 20-21, 2007, 4 pages total, San Jose USA.
Communication dated May 25, 2018 issued by the State Intellectual Property Office of P.R. China in counterpart Chinese Patent Application No. 201610373549.4.

* cited by examiner

FIG. 7

Output = Transform_hor X Input X Transform_ver $$\begin{bmatrix} R_{11} & R_{12} & R_{13} & R_{14} \\ R_{21} & R_{22} & R_{23} & R_{24} \\ R_{31} & R_{32} & R_{33} & R_{34} \\ R_{41} & R_{42} & R_{43} & R_{44} \end{bmatrix} = \begin{bmatrix} H_{11} & H_{12} & H_{13} & H_{14} \\ H_{21} & H_{22} & H_{23} & H_{24} \\ H_{31} & H_{32} & H_{33} & H_{34} \\ H_{41} & H_{42} & H_{43} & H_{44} \end{bmatrix} \times \begin{bmatrix} I_{11} & I_{12} & I_{13} & I_{14} \\ I_{21} & I_{22} & I_{23} & I_{24} \\ I_{31} & I_{32} & I_{33} & I_{34} \\ I_{41} & I_{42} & I_{43} & I_{44} \end{bmatrix} \times \begin{bmatrix} V_{11} & V_{12} & V_{13} & V_{14} \\ V_{21} & V_{22} & V_{23} & V_{24} \\ V_{31} & V_{32} & V_{33} & V_{34} \\ V_{41} & V_{42} & V_{43} & V_{44} \end{bmatrix}$$

710　　　　　720　　　　　730　　　　　740

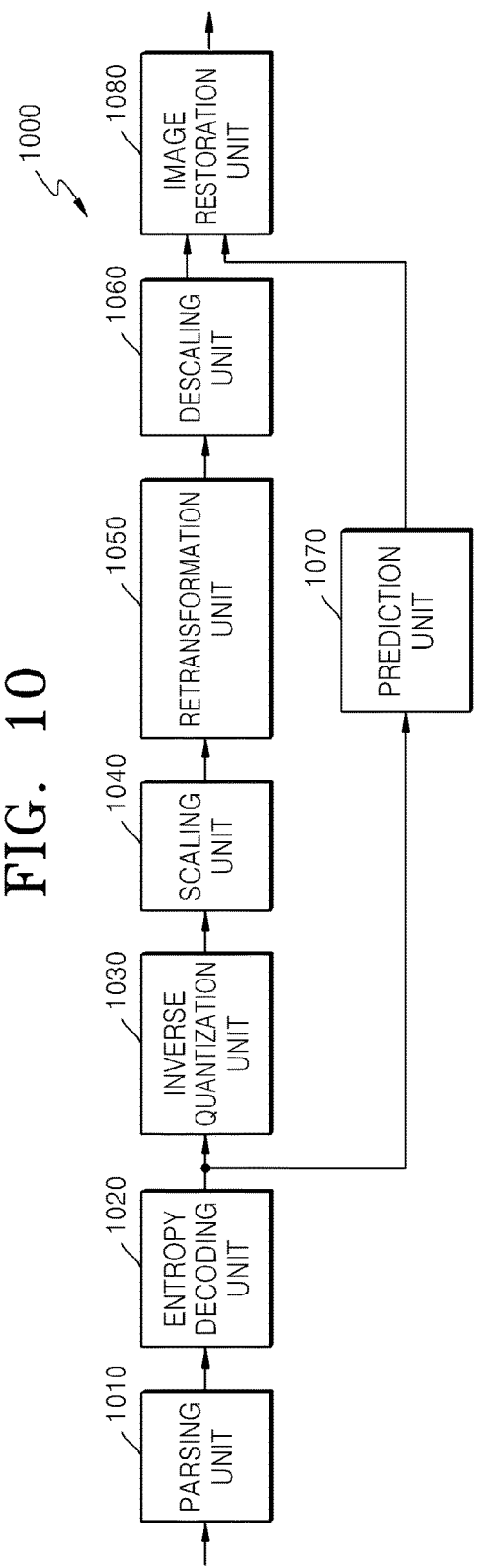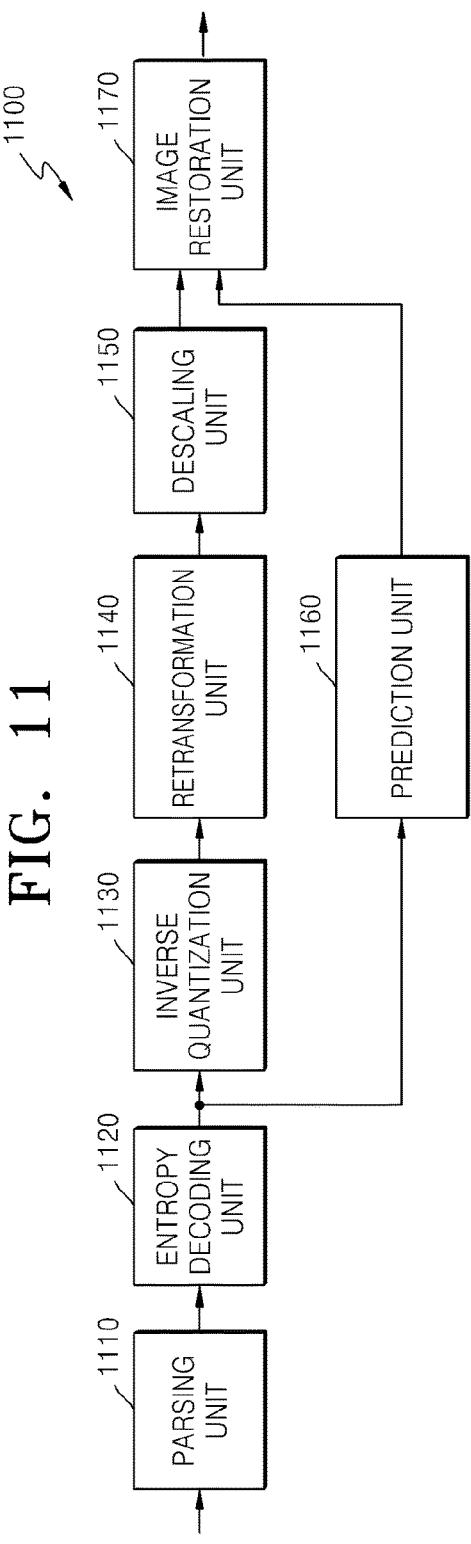

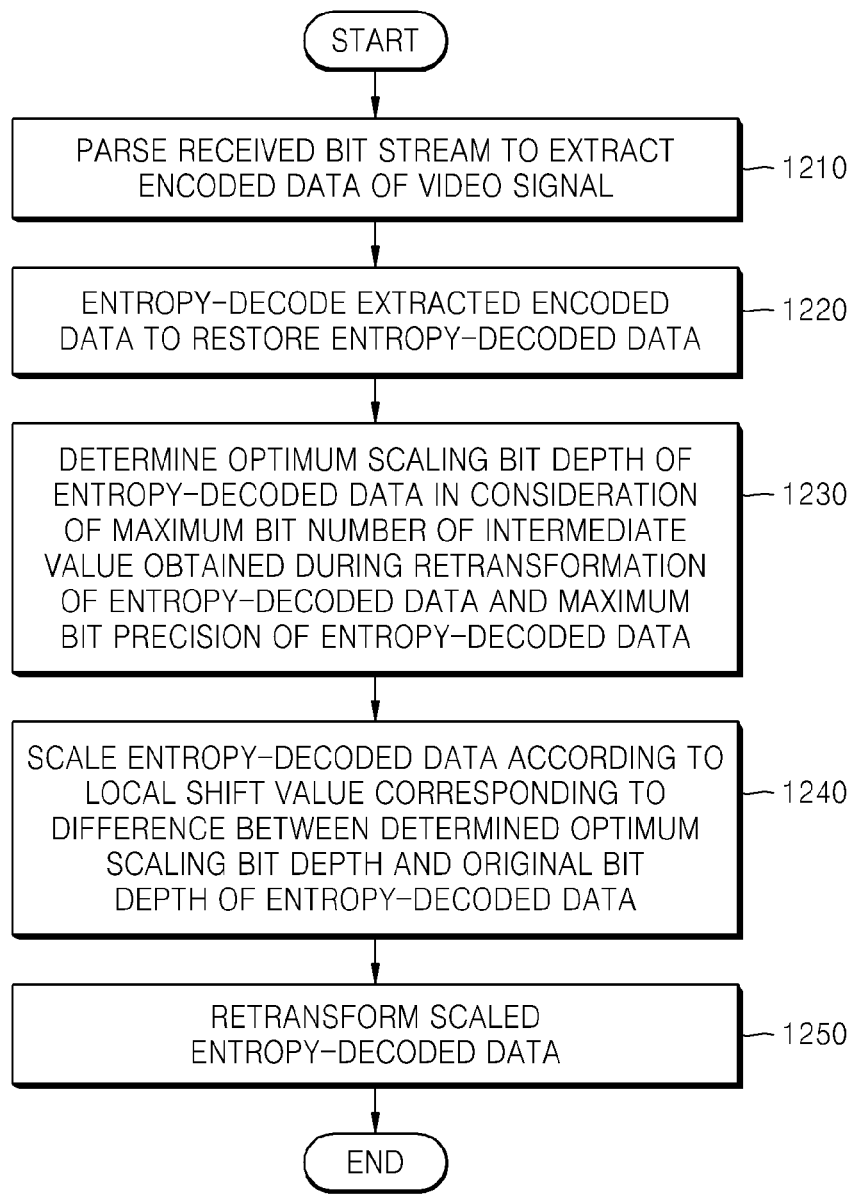

METHOD AND APPARATUS FOR ENCODING VIDEO SIGNAL AND METHOD AND APPARATUS FOR DECODING VIDEO SIGNAL

CROSS-REFERENCE TO RELATED PATENT APPLICATIONS

This application is a Continuation application of U.S. patent application Ser. No. 13/108,188, filed May 16, 2011, which claims the benefit of U.S. Provisional Patent Application No. 61/334,632, filed on May 14, 2010, and claims priority from Korean Patent Application No. 10-2011-0006485, filed on Jan. 21, 2011, in the Korean Intellectual Property Office, the disclosures of which are incorporated herein by reference in their entireties.

BACKGROUND

1. Field

Apparatuses and methods consistent with exemplary embodiments relate to encoding and decoding video signals.

2. Description of the Related Art

With the development and spread of hardware capable of reproducing and storing high-resolution or high-definition (HD) video contents, the demands for a codec for effectively encoding or decoding high-resolution or HD video contents has increased. In a related art video codec, video signals are encoded according to a limited encoding method based on a macro-block with a predetermined size.

The quality of an image to be displayed may be affected by a bit number that expresses an image data value. In particular, as a bit depth indicating the precision of image data, that is, the bit number expressing the image data value, increases, data may be expressed at more various levels. However, when the bit depth is excessively increased to increase the precision of the image data, overflow may occur during a process of processing the image data or a rounding error may occur due to a fixed point operation.

SUMMARY

The present invention provides a method and apparatus for encoding a video signal and a method and apparatus for decoding the video signal, which may increase a bit depth of the video signal during transformation and inverse-transformation of the video signal to improve calculation precision and may process the video signal so as to prevent the occurrence of overflow exceeding an allowable bit depth during a calculation operation despite an increase in bit depth.

According to an aspect of an exemplary embodiment, there is provided a method of encoding a video signal, the method including: determining an optimum scaling bit depth in consideration of a maximum bit number of an intermediate value obtained during transformation of the video signal and a maximum bit precision of the video signal; scaling the video signal according to a local shift value corresponding to a difference between the determined optimum scaling bit depth and an original bit depth of the video signal; and transforming the scaled video signal.

According to an aspect of another exemplary embodiment, there is provided a method of decoding a video signal, the method including: parsing a received bit stream to extract encoded data of the video signal; entropy-decoding the extracted encoded data to restore entropy-decoded data; determining an optimum scaling bit depth of the entropy-decoded data in consideration of a maximum bit number of an intermediate value obtained during inverse-transformation of the entropy-decoded data and a maximum bit precision of the entropy-decoded data; scaling the entropy-decoded data according to a local shift value corresponding to a difference between the determined optimum scaling bit depth and an original bit depth of the entropy-decoded data; and inversely quantizing and inverse-transforming the scaled entropy-decoded data.

According to an aspect of another exemplary embodiment, there is provided a method of decoding a video signal, the method including: receiving a video signal scaled and encoded according to a local shift value corresponding to a difference between an optimum scaling bit depth determined in consideration of a maximum bit number of an intermediate value obtained during transformation of the video signal and a maximum bit precision of the video signal, and an original bit depth of the video signal; entropy-decoding, inversely quantizing, and inverse-transforming the received video signal to generate a decoded video signal; determining a local shift value used for descaling the decoded video signal; and descaling the decoded video signal according to the determined local shift value.

According to an aspect of another exemplary embodiment, there is provided an apparatus for encoding a video signal, the apparatus including: a scaling unit configured to determine an optimum scaling bit depth of the video signal in consideration of a maximum bit number of an intermediate value obtained during transformation of the video signal and a maximum bit precision of the video signal and scale the video signal according to a local shift value corresponding to a difference between the determined optimum scaling bit depth and an original bit depth of the video signal; and a transformation unit configured to transform the scaled video signal.

According to an aspect of another exemplary embodiment, there is provided an apparatus for decoding a video signal, the apparatus including: a parsing unit configured to parse a received bit stream and extract encoded data of the video signal; an entropy decoding unit configured to entropy-decode the extracted encoded data and restore the entropy-decoded data; a scaling unit configured to determine an optimum scaling bit depth of the entropy-decoded data in consideration of a maximum bit number of an intermediate value obtained during inverse-transformation of the entropy-decoded data and a maximum bit precision of the entropy-decoded data and scale the entropy-decoded data according to a local shift value corresponding to a difference between the determined optimum scaling bit depth and an original bit depth of the entropy-decoded data; and a inverse-transformation unit configured to inverse-transform the scaled entropy-decoded data.

According to an aspect of another exemplary embodiment, there is provided an apparatus for decoding a video signal, the apparatus including: a decoding unit configured to entropy-decode, inversely quantize, and inverse-transform a video signal scaled and encoded according to a local shift value corresponding to a difference between an optimum scaling bit depth determined in consideration of a maximum bit number of an intermediate value obtained during transformation of the video signal and a maximum bit precision of the video signal and an original bit depth of the video signal and generate a decoded video signal; and a descaling unit configured to determine a local shift value required for descaling the decoded video signal and descale the decoded video signal according to the determined local shift value.

BRIEF DESCRIPTION OF THE DRAWINGS

The above and other features and advantages will become more apparent by describing in detail exemplary embodiments with reference to the attached drawings in which:

FIG. 7 is a reference diagram of a process of transforming a video signal according to an exemplary embodiment;

FIG. 10 is a flowchart of an apparatus for decoding a video signal according to an exemplary embodiment;

FIG. 11 is a block diagram of construction of an apparatus for decoding a video signal according to another exemplary embodiment;

FIG. 12 is a flowchart illustrating a method of decoding a video signal according to an exemplary embodiment.

DETAILED DESCRIPTION OF EXEMPLARY EMBODIMENTS

Hereinafter, it is understood that expressions such as "at least one of," when preceding a list of elements, modify the entire list of elements and do not modify the individual elements of the list.

Figure 1:
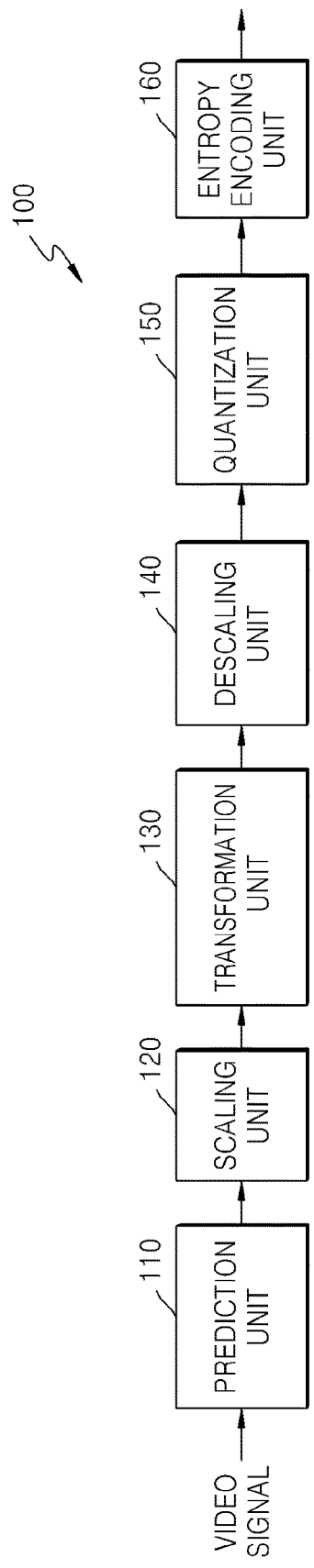
FIG. 1 is a block diagram of an apparatus for encoding a video signal according to an exemplary embodiment.

FIG. 1 is a block diagram of an apparatus 100 for encoding a video signal according an exemplary embodiment.

The video signal encoding apparatus 100 according to an exemplary embodiment may include a prediction unit 110, a scaling unit 120, a transformation unit 130, a descaling unit 140, a quantization unit 150, and an entropy encoding unit 160.

The prediction unit 110 may divide an input video signal into blocks with a predetermined size and perform an inter-prediction or intra-prediction on each of the blocks to generate prediction blocks. Specifically, the prediction unit 110 may perform an inter-prediction of generating a motion vector indicating a region similar to a current block within a predetermined search range of a reference picture restored after the reference picture is encoded and an intra-prediction of generating the prediction block using data regarding peripheral blocks disposed adjacent to the current block and may generate and output a residual signal corresponding to a difference between the prediction block and an original input block.

The scaling unit 120 may perform a scaling operation of changing the bit depth of the residual signal. The transformation unit 130 may perform a frequency transformation operation of transforming a residual signal having the changed bit depth into a frequency range. The descaling unit 140 may perform a descaling operation of restoring the changed bit depth of the residual signal transformed into the frequency range. The quantization unit 150 may quantize the descaled transformed signal. Although not shown, the video signal encoding apparatus 100 according to an exemplary embodiment may include an inverse quantization unit and a inverse transformation unit configured to inverse-quantize and inverse-transform a quantized signal to be used as reference data by the prediction unit 110. The entropy encoding unit 160 may perform variable length coding of the quantized transformation signal and generate a bit stream.

Hereinafter, operations of scaling and descaling a video signal according to an exemplary embodiment will be described in detail.

The apparatus 100 for encoding a video signal according to an exemplary embodiment may divide an input video signal into two-dimensional blocks, and the transformation unit 130 may perform a linear transformation operation used for space-frequency analysis to transform the divided blocks into frequency ranges. Examples of the linear transformation operation may include a Karhuhen-Loeve transform (KLT) operation, a singular value decomposition (SVD) operation, a discrete cosine transform (DCT) operation, and a discrete wavelet transform (DWT) operation. The linear transformation operation may be expressed by a matrix multiplication of an input block and a transformation matrix including predetermined coefficients. Although exemplary embodiments will now be described using a DCT operation as a typical example of the linear transformation operation, it will be understood that one or more other exemplary embodiments may be applied to other linear transformation operations than the DCT operation.

FIG. 7 is a reference diagram of a video transformation process according to an exemplary embodiment.

As described above, the transformation unit 130 according to an exemplary embodiment may transform a video signal into a frequency range. For example, the transformation unit 130 may perform a column-wise transformation and a row-wise transformation on N×N input blocks (where N is an integer) and generate N×N transformation coefficient blocks. Assuming that "Input" denotes the N×N input blocks, "Transform_hor" denotes a row-wise DCT transformation matrix, "Transform_ver" denotes a column-wise DCT transformation matrix, and "Output" denotes an output value of a transformation result, as shown in FIG. 7, the transformation process may be expressed by a matrix multiplication, such as the Equation: Output=Transform_hor× Input×Transform_ver. Here, a first matrix multiplication, Transform_hor×Input, may correspond to a one-dimensional DCT operation performed on each row of N×N input blocks Input, and a multiplication of Transform_hor×Input with Transform_ver may correspond to a one-dimensional DCT operation performed on each column thereof. The row-wise DCT transformation matrix Transform_hor may have a transpose matrix relationship to the column-wise DCT transformation matrix Transform_ver.

A coefficient located in a pixel position (i,k) (where i and k are integers) of a row-wise transformation matrix Transform_hor may be defined as $H_{ik}$, a value located in a position (i,k) of an input block Input may be defined as $l_{ik}$, and a coefficient located in a pixel position (i,k) of a column-wise transformation matrix Transform_ver may be defined as $V_{ik}$. A (i,k)-th element $H_{ik}$ of a row-wise DCT transformation matrix Transform_hor may be defined by Equation 1:

$$H_{ik} = \alpha_i \cos\frac{\pi(2k+1)i}{2N}, \tag{1}$$

wherein each of i and k=0, ..., N−1, $$\alpha_0 = \sqrt{\frac{1}{N}}, \alpha_i = \sqrt{\frac{2}{N}}.$$

A (i,k)-th element $V_{ik}$ of the column-wise DCT transformation matrix Transform_ver may be expressed using a value using a cosine function like the element $H_{ik}$ of the row-wise DCT transformation matrix, which is a transpose matrix. In general, a coefficient of a transformation matrix may not be used as is during a transformation process, but a value obtained by multiplying the coefficient by a predetermined scaling coefficient may be used to perform a transformation process using addition and a shift operation. Although Equation 1 shows a DCT operation using floating point numbers, the DCT operation may use fixed point transformation in addition to floating point transformation. Exemplary embodiments may be applied to all transformation matrices and is not limited by a transformation type.

When a row-wise one-dimensional DCT operation is performed on an input block 730, that is, when the first matrix multiplication Transform_hor×Input is calculated, each element of an intermediate-value matrix obtained by calculating the first matrix multiplication Transform_hor×Input may be obtained by adding product values, such as $H_{ab} \times I_{cd}$ (each of a, b, c, and d is an arbitrary integer ranging from 1 to 4). In one example, a (1, 1)-th element of the intermediate-value matrix obtained from results of the operation of the first matrix multiplication Transform_hor×Input may be $H_{11} \times I_{11} + H_{12} \times I_{21} + H_{13} \times I_{31} + H_{14} \times I_{41}$. Assuming that the bit depth of an input value of a currently transformed input block is m (where m is an integer), an absolute value of an input value $I_{cd}$ may be $2^m$ or less (that is, $I_{cd} \leq 2^m$). Also, assuming that an absolute value of each element $H_{ab}$ of a transformation block is $2^p$ or less (where p is an integer), each of a matrix obtained from operation results of the row-wise one-dimensional transformation Transform_hor×Input may be $4 \times 2^m \times 2^p$ (or $2^{m+p+2}$) or less. In another aspect, by performing the row-wise one-dimensional DCT, it may be understood that an input bit depth m may be increased by as much as p+2. That is, during the transformation process, the bit depth may be increased in the same manner as when an input value is multiplied by a predetermined value using multiplication and addition. Similarly, when the column-wise one-dimensional DCT is performed, an intermediate value of an operation process may be higher than an input value due to multiplication and addition, thereby increasing the bit depth.

Accordingly, the intermediate value obtained during the transformation process may have a value equal to or less than the maximum bit precision usable in the encoding and decoding apparatuses. Thus, exemplary embodiments provide a scaling method, which may prevent overflow during the operation process, and increase the bit depth of a video signal in consideration of an increase in bit depth during the transformation process to improve calculation precision.

Assuming that an increment in bit depth caused during the one-dimensional transformation process is TransformBitIncreasement, the bit depth of an input video signal input to the transformation unit 110 is m, a decrement in bit depth caused by the descaling unit 140 is de_scaling_bits, and the bit depth is increased by as much as TransformBitIncreasement through each of two one-dimensional transformation processes (row-wise and column-wise one-dimensional transformation processes) shown in FIG. 7, the maximum value of the bit depth of a signal output by the descaling unit 140 may be m+2×TransformBitIncreasement−de_scaling_bits. That is, an absolute value of the signal output by the descaling unit 140 may be 2^(m+2×TransformBitIncreasement−de_scaling_bits) or less. Accordingly, to prevent overflow, the maximum possible value 2^(m+2×TransformBitIncreasement−de_scaling_bits) of the intermediate value obtained during the operation process may be a maximum value usable by the video signal encoding apparatus 100 or less. That is, the maximum bit number m+2×TransformBitIncreasement−de_scaling_bits of the intermediate value of the bit depth may be the maximum bit precision usable by the video signal encoding apparatus 100 or less.

Accordingly, the scaling unit 120 may determine the optimum scaling bit depth of the residual signal output by the prediction unit 110 in consideration of the maximum value of the intermediate value. Specifically, assuming that the bit depth of the residual signal changed by the scaling unit 120 and input to the transformation unit 130 is the optimum scaling bit depth $m_{opt}$, since an intermediate value transformed and descaled by the transformation unit 130 and the descaling unit 140 is 2^($m_{opt}$+2×TransformBitIncreasement−de_scaling_bits), the intermediate value of the bit depth may be $m_{opt}$+2×TransformBitIncreasement−de_scaling_bits. When the maximum bit precision usable by the video signal encoding apparatus 100 is defined by Maxbit, a condition of Equation 2 is satisfied to prevent overflow:

$m_{opt}$+2×TransformBitIncreasement−de_scaling_bits≤Maxbit    (2).

The scaling unit 120 may determine a maximum value $m_{opt}$, which may satisfy Equation 2, and determine the maximum value $m_{opt}$ as an optimum scaling bit depth $m_{opt}$. The scaling unit 120 may compare the determined optimum scaling bit depth $m_{opt}$ with a bit depth m of a residual signal input by the prediction unit 110, and determine a local shift value local_shift, which is a difference between the optimum scaling bit depth $m_{opt}$ and the bit depth m of the residual signal, as expressed in Equation 3:

local_shift=$m_{opt}$−m    (3).

When the local shift value local_shift is more than 0, that is, when the determined optimum scaling bit depth $m_{opt}$ is more than the bit depth m of the residual signal, the scaling unit 120 may shift the residual signal leftward ('<<') by as much as the local shift value local_shift to increase the bit depth m of the residual signal, thus increasing the bit precision of the residual signal. That is, assuming that an original residual signal is "Input" and a residual signal with a changed bit depth is "Adjusted_Input," the scaling unit 120 may change the bit depth of the residual signal as in Equation 4:

Adjusted_Input=Input<<local shift    (4)

For example, when the bit depth of the residual signal is 5 and the optimum scaling bit depth $m_{opt}$ is 8, the residual signal may be shifted leftward by as much as 3 bits so that the bit depth of the residual signal can be increased to 8.

In addition, when the local shift value local_shift is less than 0, that is, when the determined optimum scaling bit depth $m_{opt}$ is less than the bit depth m of the residual signal, the scaling unit 120 may shift the residual signal rightward ('>>') by as much as an absolute value of the local shift value local_shift to reduce the bit depth of the residual signal. That is, the scaling unit 120 may change the bit depth of the residual signal as expressed in Equation 5:

Adjusted_Input=(Input+Offset)>>|local_shift|(when Input≥0)

Adjusted_Input=−((−Input+Offset)>>|local_shift| (when Input<0)    (5).

In Equation 5, Offset=(1<<(|local_shift|−1)). When the local shift value local_shift is less than 0, the scaling unit j120 may perform a leftward shift operation in consideration of rounding and sign information as shown in Equation 5 to reduce the bit depth. When the local shift value local_shift is 0, the scaling unit 120 may skip the scaling operation.

The descaling unit 140 may perform a descaling operation of restoring the bit depth changed by the scaling unit 120 to an original bit depth. Specifically, when the local shift value local_shift is more than 0, that is, when the determined optimum scaling bit depth $m_{opt}$ is more than the bit depth m of the residual signal, the descaling unit 140 may shift a value obtained by adding a predetermined offset to a transformed video signal rightward to reduce the bit precision of the transformed video signal. When the local shift value local_shift is less than 0, that is, when the determined optimal scaling bit depth $m_{opt}$ is less than the bit depth m of the residual signal, the descaling unit 140 may shift the transformed video signal leftward to increase the bit precision of the transformed video signal. Assuming that a scaled, transformed signal output by the transformation unit 130 is "Adjusted_Output" and the video signal restored to an original scale by the descaling unit 140 is "Output," a descaling algorithm may be as follows:

```
{
If (local_shift>0)
{       If (Adjusted_output≥0)
        Output=(Adjusted_output+Offset)>>local_shift
        else
        Output=-((-Adjusted_output+Offset)>>local_shift
}
else
Output=Adjusted_output << local_shift
}
In the descaling algorithm, off_set=(1<<(local_shift-1)).
```

Figure 2:
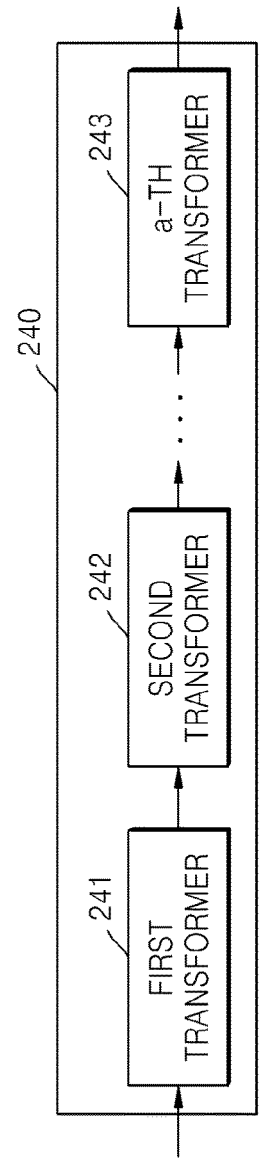
FIG. 2 is a block diagram of a detailed construction of a transformer of FIG. 1.

FIG. 2 is a block diagram of a detailed construction of the transformation unit 130 of FIG. 1.

In general, a transformation unit 240 may include a-stage transformers 241 to 243 (where a is an integer). As described above with reference to FIG. 7, a DCT operation may include a two-step transformation operation including a row-wise one-dimensional transformation operation and a column-wise one-dimensional transformation operation. Assuming that a bit depth increased by each of the a-stage transformers 241 to 243 is TransformBitIncreasement$_k$ (where k is an integer ranging from 1 to a), the amount of the bit depth increased by the transformation unit 240 of FIG. 2 may be:

$$\sum_{k=1}^{a} TransformBitIncreasement_k.$$

Accordingly, when the transformation unit 130 of FIG. 1 includes the a-stage transformers 241 to 243, as shown in FIG. 2, the scaling unit 120 may determine the maximum value $m_{opt}$, which may satisfy:

$$m_{opt} + \sum_{k=1}^{a} TransformBitIncreasement_k - de\_scaling\_bits \le Maxbit,$$

and determine the maximum value $m_{opt}$ as the optimum scaling bit depth like in Equation 4. Similarly, assuming that the descaling unit 140 includes b-stage descaling units (where b is an integer) and a bit depth reduced by each descaling step is de_scaling_bits$_k$ (where k is an integer ranging from 1 to b), the scaling unit 120 may determine the maximum value $m_{opt}$, which satisfies Equation 6, and determine the maximum value $m_{opt}$ as an optimum scaling bit depth:

$$m_{opt} + \sum_{k=1}^{a} TransformBitIncreasement_k - \sum_{k=1}^{b} de\_scaling\_bits \le Maxbit. \quad (6)$$

In general, when a transformation steps are performed, a−1 or smaller descaling steps may be performed. Thus, b may be equal to a−1.

Figure 3:
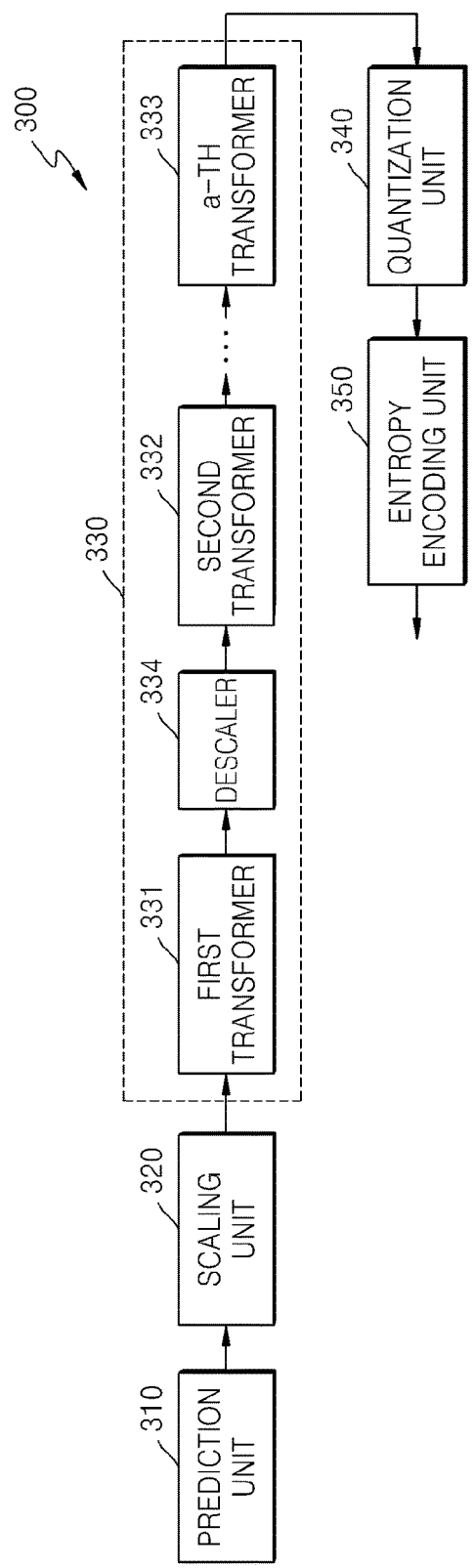
FIG. 3 is a block diagram of construction of an encoding apparatus according to a second exemplary embodiment.

FIG. 3 is a block diagram of construction of an encoding apparatus 300 according to a second exemplary embodiment.

Referring to FIG. 3, the encoding apparatus 300 according to the second exemplary embodiment may include a prediction unit 310, a scaling unit 320, a transformation unit 330, a quantization unit 340, and an entropy encoding unit 350. As compared with the video signal encoding apparatus 100 of FIG. 1, in the encoding apparatus 300 according to the second exemplary embodiment, the transformation unit 330 may include a-stage transformers 331, 332, and 333 (where a is an integer), any one of which may be followed by a single descaler 334. Although FIG. 3 illustrates that the descaler 334 is next to the first transformer 331, it is understood that another exemplary embodiment is not limited thereto and the descaler 334 may be arranged in any position between the transformers. The scaling unit 320 may determine the maximum value $m_{opt}$, which may satisfy a condition of Equation 6 in consideration of an increment in bit depth caused by each of the transformers 331, 332, and 333 included in the transformation unit 330, and determine the maximum value $m_{opt}$ as the optimum scaling bit depth $m_{opt}$. Since the remaining components of the encoding apparatus 300 according to the second exemplary embodiment are the same as in the first exemplary embodiment described above with reference to FIG. 1, a detailed description thereof will be omitted.

Figure 4:
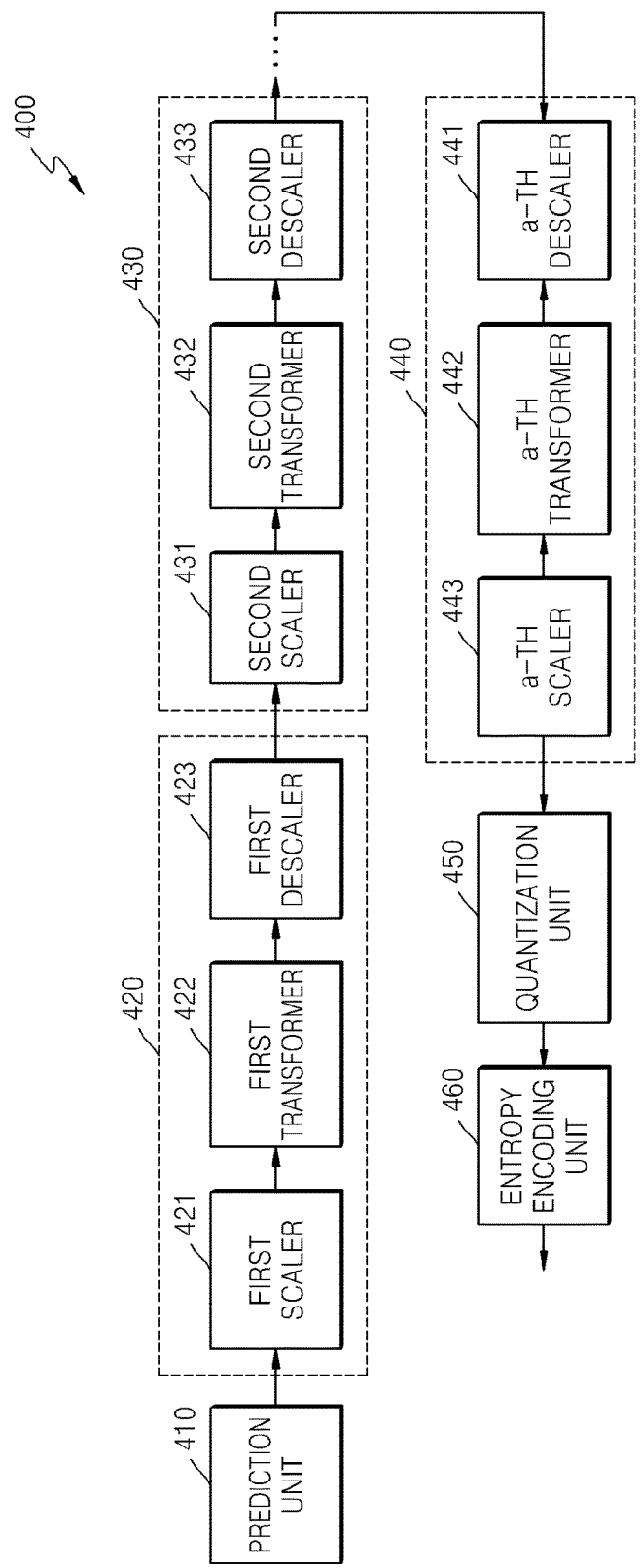
FIG. 4 is a block diagram of construction of an encoding apparatus according to a third exemplary embodiment.

FIG. 4 is a block diagram of construction of an encoding apparatus 400 according to a third exemplary embodiment.

Referring to FIG. 4, the encoding apparatus 400 according to the third embodiment may include a prediction unit 410, a transformation processors 420, 430, and 440 (where a is an integer), a quantization unit 450, and an entropy encoding unit 460. As shown in FIG. 4, the a transformation processors 420, 430, and 440 may include scalers 421, 431, and 441, transformers 422, 432, and 442, and descalers 423, 433, and 443, respectively. As in the first exemplary embodiment, each of the a transformation processors 420, 430, and 440 of the encoding apparatus 400 according to the third embodiment may determine an optimum scaling bit depth in consideration of the maximum bit number and maximum bit precision of an intermediate value obtained during each transformation operation of a residual signal and perform a scaling operation based on a local shift value, which is a difference between the determined optimum scaling bit depth and an original bit depth of the residual signal. Also, each of the a transformation processors 420, 430, and 440 of the encoding apparatus 400 may perform a transformation operation on the scaled signal and restore the transformed signal to the original bit depth. For example, assuming that a bit depth increased by the transformer 422 is Transform- BitIncreasement, a bit depth reduced by the descaler 422 is de_scaling_bits, and a bit depth of a signal output by the scaler 421 is $m_{opt}$, the scaler 421 may determine an optimal scaling bit depth $m_{opt}$, which satisfies $m_{opt}$+TransformBitIncreasement−de_scaling_bits≤Maxbits, and calculate the local shift value local_shift, which is a difference between the optimum scaling bit depth $m_{opt}$ and the bit depth m of the residual signal, as shown in Equation 3.

When the local shift value local_shift is more than 0, the scaler 421 may shift the residual signal by as much as the local shift value local_shift leftward ('<<') to increase the bit depth of the residual signal. When the local shift value local_shift is less than 0, the scaler 421 may shift the residual signal rightward to reduce the bit depth of the residual signal. A signal having a bit depth changed by the scaler 421 may be output to the transformer 422, and a signal transformed into a frequency range by the transformer 422 may be restored to an original bit depth by the first descaler 423. Each of the second and third transformation processors 430 and 440 may perform the same detailed scaling, transformation, and descaling operations as the first transformation processor 420 except that a signal output by a previous transformation process is used as an input signal.

Figure 5:
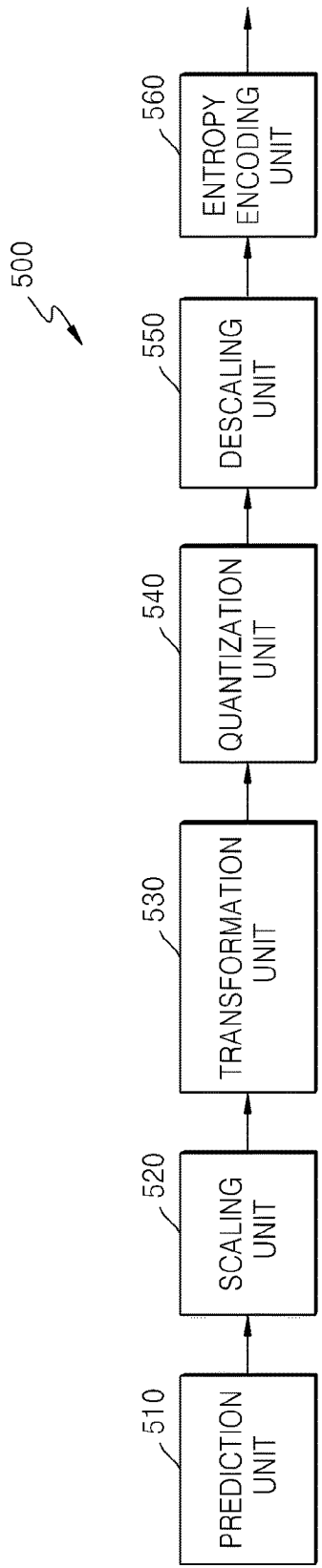
FIG. 5 is a block diagram of construction of an encoding apparatus according to a fourth exemplary embodiment.

FIG. 5 is a block diagram of construction of an encoding apparatus 500 according to a fourth exemplary embodiment.

Referring to FIG. 5, the encoding apparatus 500 according to the fourth exemplary embodiment may include a prediction unit 510, a scaling unit 520, a transformation unit 530, a quantization unit 540, a descaling unit 550, and an entropy encoding unit 560. Operation of the encoding apparatus 500 according to the fourth exemplary embodiment may be the same as that of the video signal encoding apparatus 100 according to the first exemplary embodiment except that a descaling operation of the descaling unit 550 is performed after a quantization operation of the quantization unit 540, and thus, a detailed description thereof will be omitted.

Figure 6:
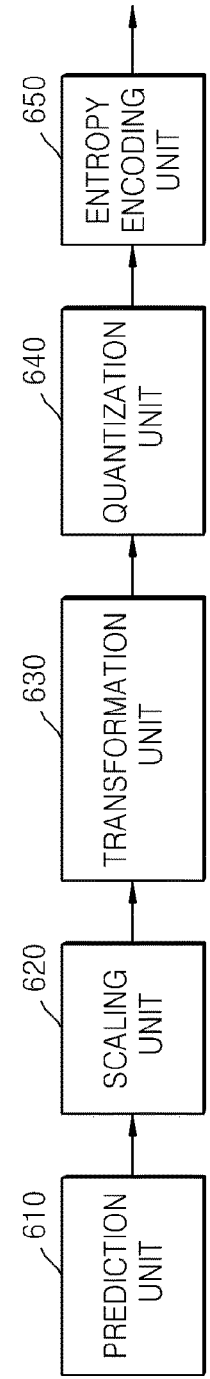
FIG. 6 is a block diagram of construction of an encoding apparatus according to a fifth exemplary embodiment.

FIG. 6 is a block diagram of construction of an encoding apparatus 600 according to a fifth exemplary embodiment.

Referring to FIG. 6, the encoding apparatus 600 according to the fifth exemplary embodiment may include a prediction unit 610, a scaling unit 620, a transformation unit 630, a quantization unit 640, and an entropy encoding unit 650. The encoding apparatus 600 according to the fifth exemplary embodiment may perform similar operations to the video signal encoding apparatus 100 according to the first exemplary embodiment except that a descaling unit is not provided. Although the encoding apparatus 600 according to the fifth exemplary embodiment does not perform a descaling operation, a decoding apparatus 1100 according to another exemplary embodiment described below with reference to FIG. 11 may perform a descaling operation such that a signal restored at a decoding side may have the same bit depth as an encoded original video signal. Since the encoding apparatus 600 according to the fifth exemplary embodiment does not include the descaling unit, the scaling unit 620 may calculate a maximum value of an intermediate value Temp obtained during a transformation process using the transformation unit 630, as shown in Equation 7:

$$Temp = 2m + \sum_{k=1}^{a} TransformBitIncreasement_k, \quad (7)$$

wherein the intermediate value Temp may be obtained on the assumption that the transformation unit 630 includes a-stage transformers and a bit depth increased by the a-stage transformers is TransformBitIncreasement$_k$ (where k is an integer ranging from 1 to a).

The scaling unit 620 may determine the maximum value $m_{opt}$, which may satisfy Equation 8, and determine the maximum value $m_{opt}$ as an optimum scaling bit depth $m_{opt}$.

$$m_{opt} + \sum_{k=1}^{a} TransformBitIncreasement_k \leq \text{Maxbit.} \quad (8)$$

The scaling unit 620 may compare the determined optimum scaling bit depth $m_{opt}$ with the bit depth m of the residual signal input by the prediction unit 610, determine the local shift value local_shift, which is a difference between the optimum scaling bit depth $m_{opt}$ and the bit depth m of the residual signal, perform a shift operation on the residual signal depending on whether or not the determined local shift value local_shift is more or less than 0, and change the bit depth of the residual signal. As described above, the residual signal having a changed bit depth may undergo transformation, quantization, and entropy encoding operations to generate a bit stream.

In order for the decoding apparatus 1100 of FIG. 11 corresponding to the encoding apparatus 600 according to the fifth exemplary embodiment to perform a descaling operation, a local shift value local_shift by which the encoding apparatus 600 performed a scaling operation is signaled. The local shift value local_shift determined by the scaling unit 620 may have a predetermined value determined in consideration of at least one of the size of a transformation block used during a transformation process, an original bit depth of a video signal, and a quantization parameter. When the local shift value local_shift is determined using at least one of the size of the transformation block, the original bit depth of the video signal, and the quantization parameter, since the decoding apparatus 1100 may determine a local shift value local_shift using the above-described parameters, an additional process of encoding the local shift value local_shift may be omitted.

When the scaling unit 620 determines the optimum scaling bit depth as expressed in Equation 8 and determines the local shift value local_shift, the local shift value local_shift used for a scaling operation is signaled in block units. In this case, only a difference between the local shift value local_shift of a current block and the local shift value local_shift of a peripheral block may be included in a bit stream in block units instead of signaling an actual local shift value local_shift so that the local shift value local_shift can be transmitted to a decoding terminal. Like in the above-described fifth exemplary embodiment, and also in the above-described encoding apparatuses according to the first through fourth exemplary embodiments, the scaling unit 620 may calculate an optimum scaling bit depth and determine a local shift value local_shift, only a difference between the local shift value local_shift of the current block and the local shift value local_shift of the peripheral block may be included in a bit stream so that information on the local shift value local_shift can be transmitted to a decoding terminal.

Figure 8:
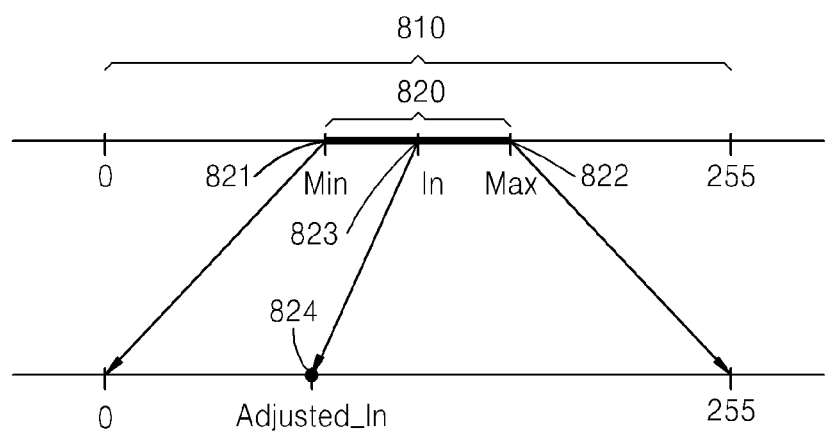
FIG. 8 is a reference diagram of a scaling operation according to another exemplary embodiment.

FIG. 8 is a reference diagram of a scaling operation according to another exemplary embodiment.

In general, a video format of a digital video processing apparatus may employ a fixed bit depth. A related art video format may include 8 bits allocated to each pixel in each color. In a video format having an N-bit bit depth, since a pixel value is distributed in a section [0, $2^N$−1] (i.e., a section between 0 and $2^N-1$), a pixel value of a video sequence having an 8-bit bit depth may be distributed in a section $[0, 2^8-1]$. The pixel value of the video sequence may be more probably distributed near the center of the pixel value section and improbably distributed near the outside thereof. That is, the distribution of a pixel value of an original video sequence may be given by Equation 9:

$$0 \leq Min \leq Org \leq Max \leq 2^N-1 \qquad (9).$$

Since each of an original pixel value Org and minimum and maximum values Min and Max of the original pixel value Org is greater than or equal to 0 and less than or equal to $2^N-1$, the original pixel value Org may be distributed in a pixel value section with a smaller range than an actually possible maximum range $2^N-1$.

Referring to FIG. 8, a pixel value having an 8-bit bit depth may be distributed in a section 810 [0, 255], while an actual original pixel value may be distributed in a section 820 [Min, Max]. When the original pixel value is distributed only in a partial section but not in a range from a maximum limit to a minimum limit, which may be expressed using an original bit depth, a pixel value may be expressed at more various levels by expanding a dynamic range of the original pixel value to the range from the maximum limit to the minimum limit, which may be expressed using the original bit depth. Thus, an image processing effect may be improved. Accordingly, in a scaling unit according to another exemplary embodiment, when minimum and maximum values of an original pixel value are known, a dynamic range of the original pixel value may vary by as much as the determined optimum scaling bit depth and an operation of scaling a video signal may be performed based on the varied dynamic range of the original pixel value.

Specifically, assuming that the minimum value of the pixel value of the video signal is Min (821), the maximum value of the pixel value of the video signal is Max (822), and an arbitrary value in a section 820 [Min,Max] is In (823), when the section 820 [Min,Max] expands to a section $[0, 2^{m_{opt}}-1]$ that may be expressed using the determined optimum scaling bit depth $m_{opt}$, the value In (832) may be changed into a value Adjusted_In as shown in Equation 10:

$$\text{Adjusted\_In} = \frac{(\text{In} - \text{Min})}{\text{Max} - \text{Min}} * (2^{m_{opt}} - 1). \qquad (10)$$

The scaling unit may shift the video signal changed by Equation 10 leftward or rightward according to a local shift value local_shift as described above and perform a scaling operation.

When a dynamic range of a video signal is changed as shown in Equation 10, a descaling unit may restore a transformed video signal to an original range using minimum and maximum values Min and Max of a video signal and perform a descaling operation on the video signal with the restored range.

Specifically, assuming that a video signal having a changed dynamic range and transformed by a transformation unit and output is "Adjusted_Output," the descaling unit may restore a value Adjusted_Output to the original range of the video signal as shown in Equation 11, descale the video signal having the restored range to an original bit depth, and generate an output value Output having the restored range and original bit depth:

Output=(Adjusted_output)*(Max−Min)/($2^{m_{opt}}-1$))+ Min    (11).

Figure 9:
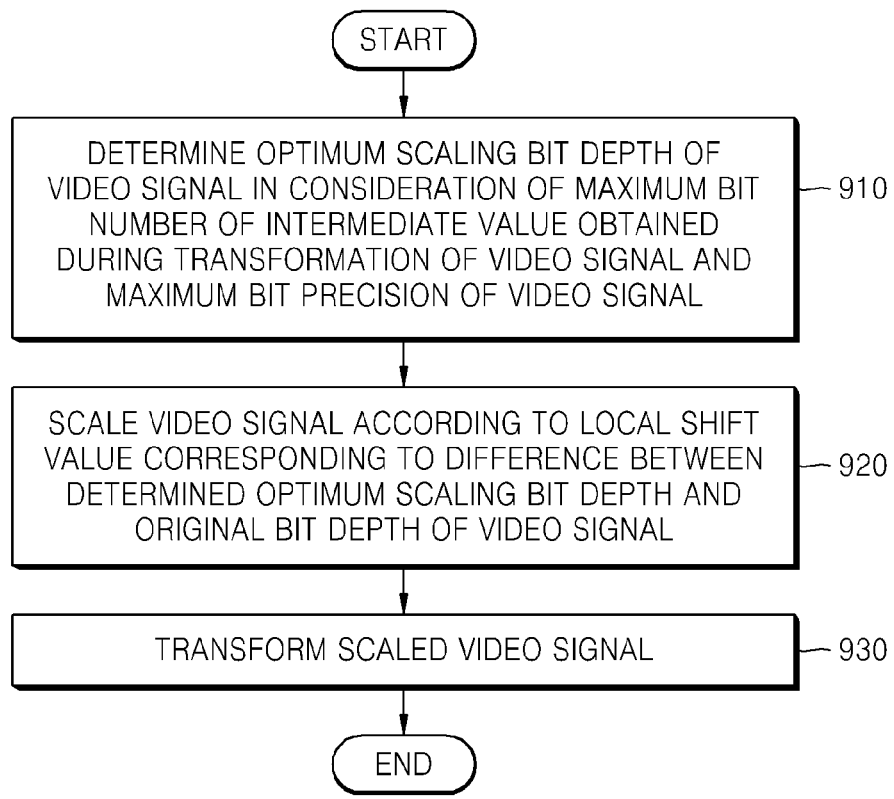
FIG. 9 is a flowchart illustrating a method of encoding a video signal according to an exemplary embodiment.

FIG. 9 is a flowchart illustrating a method of encoding a video signal according to an exemplary embodiment.

Referring to FIG. 9 in operation 910, an optimum scaling bit depth of a video signal may be determined in consideration of the maximum bit number of an intermediate value obtained during an operation of transforming a video signal and the maximum bit precision of the video signal. As described above, the maximum bit number of the intermediate value may be a value obtained by subtracting a descaling bit rate reduced by a descaling operation for reducing an expanded bit depth, which may correspond to a scaling operation for expanding a bit depth of the video signal, from a value obtained by adding a transformation bit increment, which is a bit increment obtained during the operation of transforming the video signal, to an original bit depth of the video signal. When the transformation of the video signal includes a transformation steps and b descaling steps (where a and b are integers), the descaling unit may determine the optimum scaling bit depth such that a value obtained by subtracting a value obtained by adding descaling bit rates obtained by the respective b descaling steps from a value obtained by adding transformation bit increments obtained by the respective a transformation steps to the optimum scaling bit depth, as shown in Equation 6 above.

In operation 920, the video signal may be scaled according to a local shift value corresponding to a difference between the determined optimum scaling bit depth and the original bit depth of the video signal. Specifically, when the determined optimum scaling bit depth is greater than the original bit depth of the video signal, the video signal may be shifted leftward by as much as the local shift, which is the difference between the determined optimum scaling bit depth and the original bit depth of the video signal, to increase the bit precision of the video signal. When the determined optimum scaling bit depth is less than the original bit depth of the video signal, the video signal may be shifted rightward by as much as the difference between the determined optimum scaling bit depth and the original bit depth of the video signal to reduce the bit precision of the video signal.

In operation 930, the scaled video signal may be transformed. The method of encoding the video signal according to the present exemplary embodiment may further include descaling the transformed video signal to restore the scaled, transformed video signal to the original bit depth. The descaling operation may be an inverse operation to the scaling operation. When the optimum scaling bit depth is greater than the original bit depth of the video signal, a value obtained by adding a predetermined offset to the transformed video signal may be shifted rightward to reduce the bit precision of the transformed video signal. When the optimum scaling bit depth is less than the original bit depth of the video signal, the transformed video signal may be shifted leftward to increase the bit precision of the transformed video signal.

FIG. 10 is a block diagram of an apparatus 1000 for decoding a video signal according to an exemplary embodiment.

Referring to FIG. 10, the apparatus 1000 for decoding a video signal according to the present exemplary embodiment may include a parsing unit 1010, an entropy decoding unit 1020, an inverse quantization unit 1030, a scaling unit 1040, a inverse transformation unit 1050, a descaling unit 1060, a prediction unit 1070, and an image restoration unit 1080.

The parsing unit 1010 may parse a received bit stream and extract encoded data of a video signal. The entropy decoding unit 1020 may perform an entropy decoding operation on the extracted encoded data and restore entropy-decoded data. The inverse quantization unit 1030 may inversely quantize the entropy-decoded data. The scaling unit 1040 may determine an optimum scaling bit depth of the entropy-decoded data in consideration of the maximum bit number of an intermediate value obtained during an operation of inverse-transforming the entropy-decoded data and the maximum bit precision of the entropy-decoded data and scale the entropy-decoded data according to a local shift value, which is a difference between the determined optimum scaling bit depth and an original bit depth of the entropy-decoded data. A specific operation of the scaling unit 1040 may be similar to that of the scaling unit 120 of the video signal encoding apparatus 100 according to the exemplary embodiment described above with reference to FIG. 1, except that the entropy-decoded data is used as an input value and the maximum bit number of the intermediate value obtained by the inverse transformation unit 1050 is considered to determine the optimum scaling bit depth.

The inverse transformation unit 1050 may inverse-transform the scaled entropy-decoded data, while the descaling unit 1060 may perform a descaling operation to restore the bit depth of the inverse-transformed data to the original bit depth. An output value of the descaling unit 1060 may be a residual signal having the original bit depth input to a scaling unit during an encoding operation. The prediction unit 1070 may perform an inter-prediction operation or intra-prediction operation to generate a prediction signal, and the image restoration unit 1080 may add the prediction signal and the residual signal having the original bit depth to restore a video signal.

FIG. 11 is a block diagram of an apparatus 1100 for decoding a video signal according to another exemplary embodiment.

Referring to FIG. 11, the apparatus 1100 for decoding a video signal according to another exemplary embodiment may include a parsing unit 1110, an entropy decoding unit 1120, an inverse quantization unit 1130, a inverse transformation unit 1140, a descaling unit 1150, a prediction unit 1160, and an image restoration unit 1170. The decoding apparatus 1100 according to the present exemplary embodiment may perform a descaling operation, which is skipped by the encoding apparatus 600 of FIG. 6, according to the fifth exemplary embodiment. The descaling unit 1150 may determine a local shift value used for descaling a decoded video signal and descale the decoded video signal according to the determined local shift value. When the local shift value has a predetermined value determined in consideration of at least one of the size of a transformation block, an original bit depth of the video signal, and a quantization parameter, the descaling unit 1150 may determine the same local shift value as used during an encoding process using at least one of the above-described parameters and perform a descaling operation. When the local shift value is signaled using a difference between a local shift value of a current block and a local shift value of a peripheral block in units of predetermined blocks constituting the video signal, the descaling unit 1150 may add a local shift value of a previously decoded peripheral block and a difference in local shift restored from a bit stream to restore the local shift value of the current block and perform a descaling operation using the restored local shift value. Since other components of the decoding apparatus 1100 perform similar operations to those of the decoding apparatus 1000 according to the exemplary embodiment described above with reference to FIG. 10, a detailed description thereof will be omitted.

FIG. 12 is a flowchart illustrating a method of decoding a video signal according to an exemplary embodiment.

Referring to FIG. 12, in operation 1210, a received bit stream may be parsed to extract encoded data of the video signal. In operation 1220, the extracted encoded data may be entropy-decoded to restore entropy-decoded data.

In operation 1230, an optimum scaling bit depth of the entropy-decoded data may be determined in consideration of a maximum bit number of an intermediate value obtained during inverse-transformation of the entropy-decoded data and maximum bit precision of the entropy-decoded data. Here, the maximum bit number of the intermediate value may be a value obtained by subtracting a descaling bit rate reduced by a descaling operation for reducing an expanded bit depth, which corresponds to a scaling operation for expanding a bit depth of the entropy-decoded data from a value obtained by adding a inverse transformation bit increment, which is a bit increment obtained during the inverse-transformation of the entropy-decoded data to an original bit depth of the entropy-decoded data. When the decoding operation includes c inverse-transformation steps (where c is an integer) and d descaling steps for reducing the expanded bit depth (where d is an integer), which correspond to the scaling operation for expanding the bit depth of the entropy-decoded data, the optimum scaling bit depth may be determined such that a value obtained by subtracting a value obtained by adding descaling bit rates obtained by the respective d descaling steps from a value obtained by adding inverse-transformation bit increments obtained by the respective c inverse-transformation steps to the optimum scaling bit depth is less than the maximum bit precision.

In operation 1240, the entropy-decoded data may be scaled according to a local shift value, which is a difference between the determined optimum bit depth and the original bit depth of the entropy-decoded data. Specifically, when the optimum scaling bit depth is greater than the original bit depth of the entropy-decoded data, the entropy-decoded data may be shifted leftward by as much as the difference between the optimum scaling bit depth and the original bit depth of the entropy-decoded data to increase the bit precision of the entropy-decoded data. When the optimum scaling bit depth is less than the original bit depth of the entropy-decoded data, the entropy-decoded data may be shifted rightward by as much as the difference between the optimum scaling bit depth and the original bit depth of the decoded data to reduce the bit precision of the entropy-decoded data.

In operation 1250, the scaled entropy-decoded data may be inverse-transformed.

The method of decoding the video signal according to the present exemplary embodiment may further include descaling the inverse-transformed data. A descaling process may be an inverse process to a scaling process. When the optimum scaling bit depth is greater than the original bit depth of the entropy-decoded data, a value obtained by adding a predetermined offset to the inverse-transformed data may be shifted rightward to reduce the bit precision of the inverse-transformed data. When the optimum scaling bit depth is less than the original bit depth of the entropy-decoded data, the inverse-transformed data may be shifted leftward to increase the bit precision of the inverse-transformed data.

Figure 13:
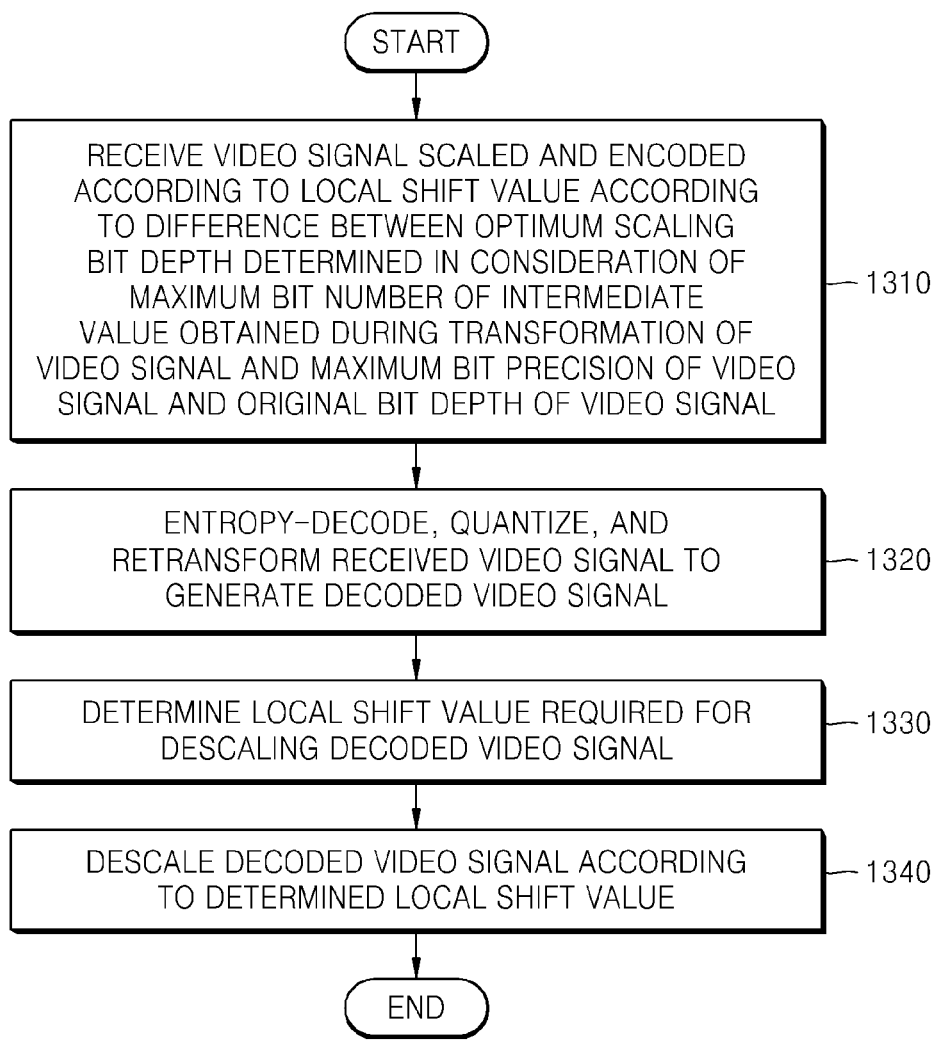
FIG. 13 is a flowchart of a method of decoding a video signal according to another exemplary embodiment.

FIG. 13 is a flowchart illustrating a method of decoding a video signal according to another exemplary embodiment. The method according to the present exemplary embodiment may correspond to a process of decoding a video signal having an original bit depth by performing a descaling operation skipped by an encoding side in the same manner as the decoding apparatus 1100 of FIG. 11.

Referring to FIG. 13, in operation 1310, a scaled, encoded video signal may be received according to a local shift value, which is a difference between an optimum scaling bit depth determined in consideration of a maximum bit number of an intermediate value obtained during transformation of the video signal and maximum bit precision of the video signal and an original bit depth of the video signal.

In operation 1320, the received video signal may be entropy-decoded, quantized, and inverse-transformed to generate a decoded video signal.

In operation 1330, the local shift value used for descaling the decoded video signal may be determined. As described above, the local shift value may be determined in consideration of the original bit depth of the video signal and a quantization parameter or determined by adding a local shift value of a previously decoded peripheral block and a difference in local shift value restored from a bit stream.

In operation 1340, the decoded video signal may be descaled according to the determined local shift value to change the bit depth of the decoded video signal to the original bit depth of the video signal used during an encoding process.

According to exemplary embodiments, the bit depth of a video signal may be increased during transformation and inverse-transformation of the video signal to improve calculation precision. Furthermore, even if the bit depth of the video signal is increased, the video signal may be processed while preventing the occurrence of overflow exceeding an allowable bit depth during a calculation operation.

Exemplary embodiments can be written as computer programs and can be implemented in general-use digital computers that execute the programs using a computer-readable recording medium. Examples of the computer-readable recording medium include storage media, such as magnetic storage media (e.g., ROMs, floppy disks, hard disks, etc.) and optimum recording media (e.g., CD-ROMs or DVDs). Moreover, one or more units of the above-described encoding and decoding apparatuses can include a processor or microprocessor executing a computer program stored in a computer-readable medium.

According to exemplary embodiments, calculation precision may be improved during processing of a video signal without causing overflow within such a range as not to exceed a bit depth allowable in a codec.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. An apparatus of decoding a video, the apparatus comprising:
   a processor configured to determine bit depth of samples in a video sequence, obtain quantized transform coefficients of a transform block in the video sequence from a bitstream, generate scaled transform coefficients of the transform block by performing inverse-quantization and scaling on the quantized transform coefficients, generate intermediate sample values of the transform block by performing vertical inverse-transformation on the scaled transform coefficients, generate residual values of the transform block by performing horizontal inverse-transformation on the intermediate sample values of the transform block, generate a prediction block by performing intra prediction or inter prediction, and restore sample values using the residual values of the transform block and the prediction block,
   wherein when the processor performs the scaling on the quantized transform coefficients, the processor determines an offset value based on a scaling variable, adds the inverse-quantized transform coefficients to the offset value and performs bit shifting on the added transform coefficients by the scaling variable, and
   wherein the scaling variable is generated by using a size of the transform block and the bit depth of samples.

2. The apparatus of claim 1, wherein each of the vertical inverse-transformation and the horizontal inverse-transformation includes linear transformation that is a discrete cosine transform (DCT) operation or a discrete wavelet transform (DWT) operation.

* * * * *